United States Patent
Shea et al.

(10) Patent No.: US 9,530,033 B2
(45) Date of Patent: Dec. 27, 2016

(54) WIRELESS TRANSPONDER UNIT, ELECTRICAL JOINT MONITORING SYSTEM INCLUDING THE SAME, AND METHOD OF MONITORING ELECTRICAL JOINTS

(71) Applicant: EATON CORPORATION, Cleveland, OH (US)

(72) Inventors: John Joseph Shea, Pittsburgh, PA (US); Jason B. Carrodus, New Brighton, PA (US)

(73) Assignee: Eaton Corporation, Cleveland, OH (US)

( * ) Notice: Subject to any disclaimer, the term of this patent is extended or adjusted under 35 U.S.C. 154(b) by 542 days.

(21) Appl. No.: 13/903,092

(22) Filed: May 28, 2013

(65) Prior Publication Data

US 2014/0354415 A1  Dec. 4, 2014

(51) Int. Cl.
*G06K 19/07* (2006.01)
*G06K 7/10* (2006.01)

(52) U.S. Cl.
CPC ....... *G06K 7/10366* (2013.01); *G06K 19/0717* (2013.01)

(58) Field of Classification Search
None
See application file for complete search history.

(56) References Cited

U.S. PATENT DOCUMENTS

| | | | | |
|---|---|---|---|---|
| 6,091,935 | A * | 7/2000 | Alexander | G06K 19/0723 455/41.1 |
| 7,260,371 | B1 * | 8/2007 | Yones | H04W 52/42 340/10.1 |
| 2005/0242086 | A1 * | 11/2005 | Imura | A47J 27/62 219/627 |
| 2007/0222590 | A1 | 9/2007 | Posamentier | |
| 2007/0236336 | A1 * | 10/2007 | Borcherding | G06K 7/0008 340/10.34 |
| 2010/0220766 | A1 * | 9/2010 | Burgard | G01K 1/026 374/183 |

(Continued)

FOREIGN PATENT DOCUMENTS

EP    2 182 581 A1    5/2010

OTHER PUBLICATIONS

European Patent Office, International Search Report and Written Opinion, May 26, 2014, 9 pp.

*Primary Examiner* — Mohamed Barakat
(74) *Attorney, Agent, or Firm* — Eckert Seamans; Nathaniel Wilks; Grant Coffield

(57) ABSTRACT

A wireless transponder unit having a maximum operating temperature and being structured to be disposed on an electrical joint includes: an integrated circuit configured to store identification information; and a resonant circuit electrically connected to the integrated circuit, the resonant circuit having a damping factor. The resonant circuit includes a capacitor, an antenna, and a resistor having a resistance and a positive thermal coefficient. A change in temperature of the wireless transponder unit causes a change in the resistance of the resistor and the damping factor of the resonant circuit. The maximum operating temperature of the wireless transponder unit is based on the damping factor of the resonant circuit.

25 Claims, 4 Drawing Sheets

(56) References Cited

U.S. PATENT DOCUMENTS

2010/0225482 A1* 9/2010 Kasai ................ G06K 19/0717
                                                    340/572.1
2012/0105086 A1* 5/2012 Bommer ................ G01N 27/04
                                                    324/713

* cited by examiner

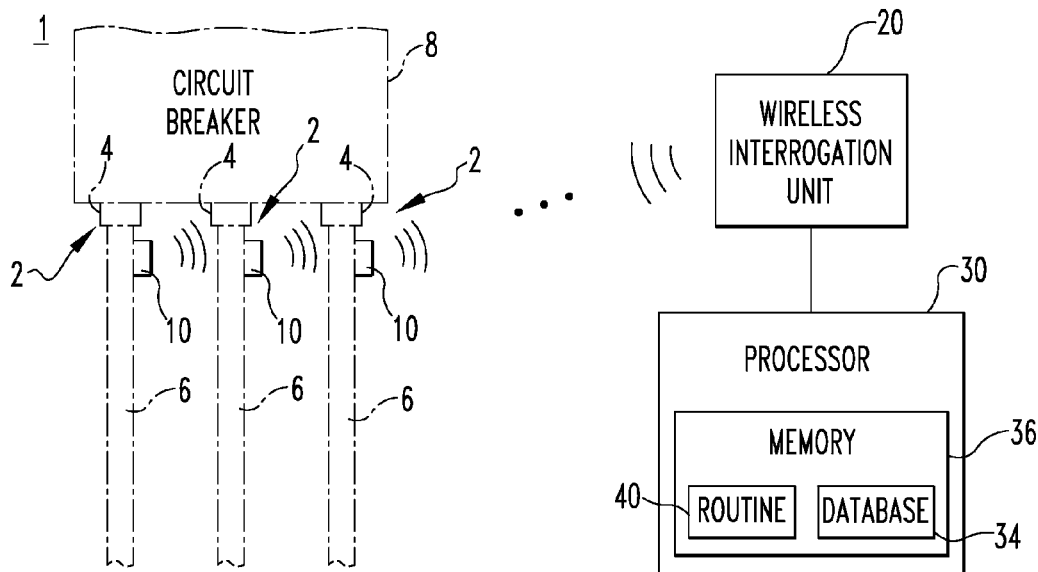
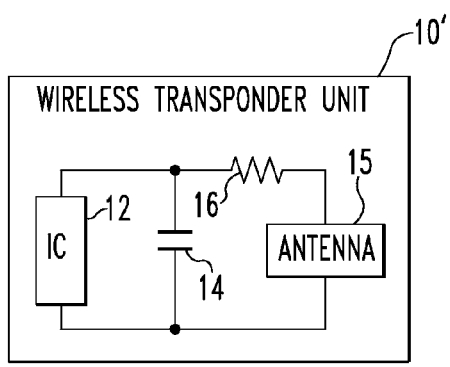
FIG.2
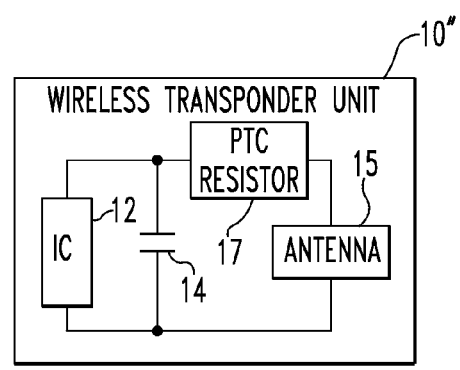
FIG.3
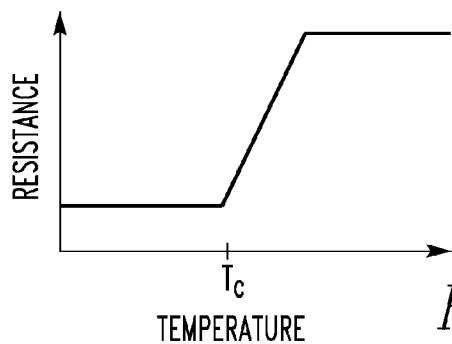
FIG.4

WIRELESS TRANSPONDER UNIT, ELECTRICAL JOINT MONITORING SYSTEM INCLUDING THE SAME, AND METHOD OF MONITORING ELECTRICAL JOINTS

BACKGROUND

Field

The disclosed concept relates generally to joint monitoring and, more particularly, to devices, systems and methods of monitoring electrical joints.

Background Information

Electrical joints are typically formed by bringing two or more conductive members into electrical contact with each other. The electrical joints can be secured together with, for example, one or more fasteners. The electrical performance of the joint, and in particular, the conductivity of the joint, depends partially on the conductive members being secured together tightly. However, even if the conductive members are initially secured together tightly, the electrical joint can loosen over time. A loosening of the electrical joint reduces the conductivity of the electrical joint and can cause additional problems such as overheating.

Due to the aforementioned problems, it is desirable to determine whether the conductive members in an electrical joint are properly secured together. However, verifying whether the conductive members in an electrical joint are properly secured together can be difficult and costly. Infrared (IR) scanning is costly and is only a spot check in time and can be a safety hazard since equipment doors need to be open while the equipment is live in order to perform an IR scan. Also, current needs to be flowing during the measurement. All this is costly and time consuming, and furthermore does not provide constant monitoring. Also, many connections are not easily accessed after they are assembled in the factory. Providing a means to monitor these connections provides additional system reliability.

There is room for improvement in devices, systems and methods of monitoring electrical joints.

SUMMARY

These needs and others are met by aspects of the disclosed concept which provide a wireless transponder unit including a resonant circuit having a resistor with a positive thermal coefficient. These needs and others are also met by aspects of the disclosed concept which provide an electrical joint monitoring system including a plurality of wireless transponder units having a maximum operating temperature. These needs and others are also met by aspects of the disclosed concept which provide a method for monitoring electrical joints and a non-transitory computer readable medium including the same.

In accordance with aspects of the disclosed concept, a wireless transponder unit having a maximum operating temperature and being structured to be disposed on an electrical joint comprises: an integrated circuit configured to store identification information; and a resonant circuit electrically connected to the integrated circuit, the resonant circuit having a damping factor, the resonant circuit including a capacitor, an antenna, and a resistor having a resistance and a positive thermal coefficient, wherein a change in temperature of the wireless transponder unit causes a change in the resistance of the resistor and the damping factor of the resonant circuit, and wherein the maximum operating temperature of the wireless transponder unit is based on the damping factor of the resonant circuit.

In accordance with other aspects of the disclosed concept, a system for monitoring a plurality of electrical joints comprises: a plurality of wireless transponder units, each of the wireless transponder units being disposed on a corresponding one of the electrical joints, having a maximum operating temperature, and being configured to output identification information in response to being interrogated; a wireless interrogation unit structured to interrogate the wireless transponder units; and a processor having a routine structured to determine a fault at the electrical joints corresponding to a number of the wireless transponder units that fail to respond to being interrogated by the wireless interrogation unit.

In accordance with other aspects of the disclosed concept, a method of monitoring a plurality of electrical joints comprises: interrogating a plurality of wireless transponder units, each of the wireless transponder units being disposed on a corresponding one of the electrical joints, having a maximum operating temperature, and being configured to output identification information in response to such interrogating; determining which of the wireless transponder units fail to respond to the interrogation; and determining a number of faults at a number of the electrical joints corresponding to a number of the wireless transponder units that fail to respond to such interrogating.

In accordance with other aspects of the disclosed concept, a non-transitory computer readable medium stores one or more programs, including instructions, which when executed by a computer, causes the computer to perform a method of monitoring a plurality of electrical joints, the method comprising: interrogating a plurality of wireless transponder units, each of the wireless transponder units being disposed on a corresponding one of the electrical joints, having a maximum operating temperature, an being configured to output identification information in response to such interrogating; determining which of the wireless transponder units fail to respond to the interrogation; and determining a number of faults at a number of the electrical joints corresponding to a number of the wireless transponder units that fail to respond to such interrogating.

In accordance with other aspects of the disclosed concept, a wireless transponder unit having a maximum operating temperature and being structured to be disposed proximate to an electrical joint comprises: an integrated circuit configured to store identification information; and a resonant circuit electrically connected to the integrated circuit, the resonant circuit including a capacitor, an antenna, and a resistor having a resistance and a negative thermal coefficient, wherein a change in temperature of the wireless transponder unit causes a change in the resistance of the resistor, wherein the resistor is electrically connected in parallel with the capacitor, and wherein the maximum operating temperature of the wireless transponder unit is based on the resistance of the resistor

BRIEF DESCRIPTION OF THE DRAWINGS

A full understanding of the disclosed concept can be gained from the following description of the preferred embodiments when read in conjunction with the accompanying drawings in which:

FIG. 1 is a top plan view of an electrical joint monitoring system with some components shown in block form in accordance with an example embodiment of the disclosed concept;

FIGS. 2 and 3 are block diagrams in schematic form of wireless transponder units in accordance with embodiments of the disclosed concept;

FIG. 4 is a plot of resistance and temperature of an example conductive polymer element;

DESCRIPTION OF THE PREFERRED EMBODIMENTS

Figure 5:
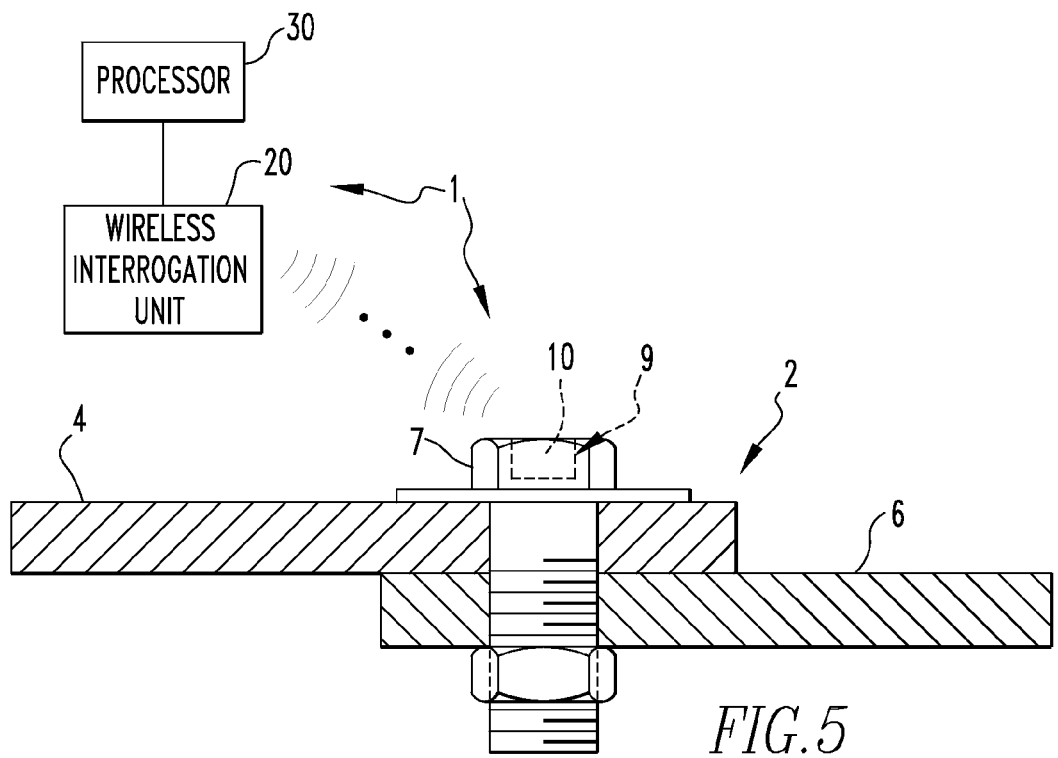
FIG. 5 is a vertical section view of an electrical joint monitoring system with some components shown in block form in accordance with another example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts and the combinations of bolts and nuts (e.g., without limitation, lock nuts), washers, clips (e.g., without limitation, spring clips) and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the term "maximum operating temperature of a wireless transponder unit" refers to the maximum temperature at which the wireless transponder unit will reliably respond to an interrogation by a wireless interrogation unit.

As employed herein, the statement that "a wireless transponder unit fails to respond to being interrogated" and similar statements shall mean that the interrogation response rate of the wireless transponder unit falls below a predetermined threshold value or that the wireless transponder unit completely fails to respond to an interrogation.

As employed herein, the term "the critical temperature of a conductive polymer resistor" shall mean the temperature at which the conductive polymer resistor experiences a relatively large change in resistance.

As employed herein, the term "processor" shall mean a programmable analog and/or digital device that can store, retrieve and process data; a controller; a control circuit; an embedded controller; a computer; a workstation; a personal computer; a microprocessor; a microcontroller; a microcomputer; a central processing unit; a mainframe computer; a mini-computer; a server; a networked processor; or any suitable processing device or apparatus.

Referring to FIG. 1, three electrical joints 2 are comprised of electrically connected first and second conductors 4,6. In the example embodiment of FIG. 1, the first conductor 4 is a stab that is electrically coupled with a circuit breaker 8, and the second conductor 6 is a busbar electrically connected to the stab. The electrical joints 2 are monitored by an electrical joint monitoring system 1.

The electrical joint monitoring system 1 includes wireless transponder units 10 (e.g., without limitation, Radio Frequency Identification (RFD) tags) disposed on each of the electrical joints 2, a wireless interrogation unit 20, and a processor 30. The wireless interrogation unit 20 is configured to interrogate the wireless transponder units 10, and the wireless transponder units 10 are configured to respond to being interrogated by the wireless interrogation unit 20 by wirelessly outputting identification information. The wireless interrogation unit 20 receives the identification information from the wireless transponder units 10 that successfully respond to being interrogated by the wireless interrogation unit 20. The processor 30 includes a routine 40 that is structured to use the identification information received by the wireless interrogation unit 20 to determine which wireless transponder units 10 successfully respond to being interrogated by the wireless interrogation unit 20. The routine 40 is further structured to determine faults at the electrical joints 2 corresponding to the wireless transponder units 110 that failed to respond to being interrogated by the wireless interrogation unit 20.

In order to determine which wireless transponder units 110 fail to respond to being interrogated by the wireless interrogation unit 20, the routine 40 of the processor 30 may set a threshold response rate (e.g., without limitation, five responses per second; or any suitable response rate). Wireless transponder units 10 that completely fail to respond to being interrogated by the wireless interrogation unit 20 or have an interrogation response rate below the threshold response rate are determined to have failed to respond to being interrogated by the wireless interrogation unit 20.

In order to determine which wireless transponder unit 110 corresponds to which electrical joint 2, a database 34 may be employed which corresponds the identification information of a wireless transponder unit 10 with identification information of the electrical joint (e.g., without limitation, a description of the electrical joint) the wireless transponder unit 10 is disposed on. The database 34 may be stored in any suitable location such as, for example and without limitation, a memory 36 included with the processor 30 or an external memory (not shown).

The routine 40 of the processor 30 may also be structured to control the wireless interrogation unit 20 to interrogate the wireless transponder units 10 as well as the rate at which the wireless interrogation unit 20 interrogates the wireless transponder units 10.

Each of the wireless transponder units 10 have a maximum operating temperature, and when the temperature of one of the wireless transponder units 10 exceeds the maximum operating temperature, the wireless transponder unit 110 will no longer reliably respond to being interrogated by the wireless interrogation unit 20. The maximum operating temperature of the wireless transponder unit 110 is determined based on components included in the wireless transponder unit 10, as will be described in more detail hereinafter with reference to the example wireless transponder units 10', 10", 10''', of respective FIGS. 2, 3, and 10.

Referring to FIG. 2, a wireless transponder unit 10' includes an integrated circuit (IC) 12 (e.g., without limitation, an RFID chip) and a resonant circuit including a capacitor 14, an antenna 15, and a resistor 16. The integrated circuit 12 stores the identification information and is configured to output the identification information via the antenna 15 in response to being interrogated by the wireless interrogation unit 20. The maximum operating temperature of the wireless transponder unit 10' is determined by the temperature at which the integrated circuit 12 fails to operate properly. In more detail, when the integrated circuit 12 is heated beyond a certain temperature, it is no longer able to reliably output the identification information via the antenna 15. In other words, the wireless transponder unit 10' will not be able to reliably respond to being interrogated by the wireless interrogation unit 20. In some example embodiments, the integrated circuit 12 is a silicon-based integrated circuit that reliably operates up to a temperature of about 150° C. Above 150° C., the silicon-based integrated circuit will not operate reliably, and thus the wireless transponder unit 10' will not be able to reliably respond to being interrogated by the wireless interrogation unit 20.

Referring to FIG. 3, another example wireless transponder unit 10" includes an integrated circuit 12 and a resonant circuit including a capacitor 14, an antenna 15, and a resistor having a positive thermal coefficient 17 ("PTC resistor"). The PTC resistor 17 has a positive thermal coefficient, which means that its resistance will increase as its temperature increases. The resonant circuit is an RLC circuit having a resonant frequency and a damping factor. Increasing the resistance of the PTC resistor 17 increases the damping factor of the resonant circuit. As the damping factor of the resonant circuit increases, the ability of the wireless transponder unit 10" to respond to being interrogated by the wireless interrogation unit 20 is reduced. When the damping factor of the resonant circuit increases too much, the wireless transponder unit 10" is unable to respond to being interrogated by the wireless interrogation unit 20. In the wireless transponder unit 10, the maximum operating temperature of the wireless transponder unit 10" is the temperature at which the damping caused by the resistance of the PTC resistor 17 prevents the wireless transponder unit 10" from being able to reliably respond to being interrogated by the wireless interrogation unit 20.

In some example embodiments of the disclosed concept, the resistance of the PTC resistor 17 has a non-linear response to changes in temperature. Some examples of PTC resistors 17 that have a non-linear response to changes in temperature are polymer-based and ceramic-based resistors. An example of the non-linear response to changes in temperature by a polymer-based resistor is shown in FIG. 4. As shown in FIG. 4, the polymer-based resistor undergoes a relatively large increase in resistance around a critical temperature $T_C$. In one example embodiment of the disclosed concept, the PTC resistor 17 has a non-linear response to changes in temperature and the wireless transponder unit 10" is able to respond to being interrogated by the wireless interrogation unit 20 when the temperature of the wireless transponder unit 10" is below the critical temperature $T_C$ of the PTC resistor 17. However, when the temperature of the wireless transponder unit 10" is above the critical temperature $T_C$ of the PTC resistor 17, the damping factor of the resonance circuit is increased enough that the wireless transponder unit 10" cannot reliably respond to being interrogated by the wireless interrogation unit 20. In other words, the maximum operating temperature of the wireless transponder unit 10" is about equal to the critical temperature $T_C$ of the PTC resistor 17.

Figure 10:
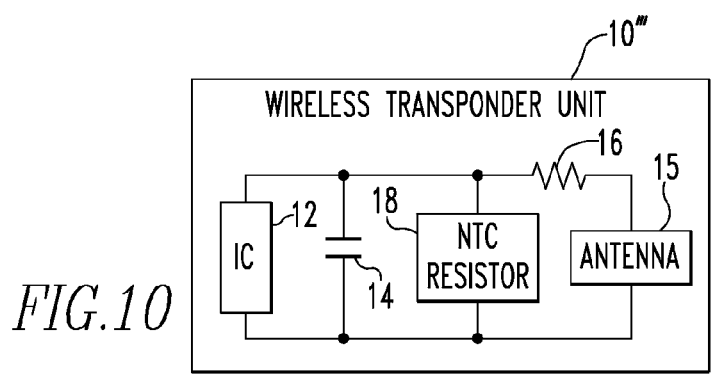
FIG. 10 is a block diagrams in schematic form of wireless transponder units in accordance with embodiments of the disclosed concept.

While a PTC resistor 17 is disclosed, it is also contemplated that a resistor exhibiting a negative thermal coefficient 18 ("NTC resistor") may be employed without departing from the scope of the disclosed concept, as shown in FIG. 10. For example and without limitation, wireless transponder unit 10'" includes the NTC resistor 18 placed in parallel with the capacitor 14 and the antenna 15. As the temperature of the NTC resistor 18 increases, the NTC resistor 18 will shunt the capacitor 14 and the antenna 15 and prevent the wireless transponder unit 10'" from reliably responding to being interrogated by the wireless interrogation unit 20.

To summarize, in the wireless transponder unit 10' of FIG. 2, the maximum operating temperature of the wireless transponder unit 10' is based on the temperature at which the integrated circuit 12 fails to reliably operate. The maximum operating temperature of the wireless transponder unit 10" is based on the damping factor of the resonant circuit. In other words, the maximum operating temperature of the wireless transponder unit 10" is about equal to the temperature at which the resistance of the PTC resistor 17 causes the damping factor of the resonant circuit to be high enough to prevent the wireless transponder unit 10" from reliably responding to being interrogated (e.g., without limitation, the critical temperature of the PTC resistor 17). Finally, the maximum operating temperature of the wireless transponder unit 10'" of FIG. 10 is based on the resistance of the NTC resistor 18. In other words, the maximum operating temperature of the wireless transponder unit 10'" is based on the temperature at which the resistance of the NTC resistor 18 becomes low enough to shunt the capacitor 14 and the antenna 15, thus preventing the wireless transponder unit 10'" from reliably responding to being interrogated.

It is contemplated that any one, or any combination, of wireless transponder units 10, 10', 10", 10'" may be employed in the electrical joint monitoring system 1 without departing from the scope of the disclosed concept. While wireless transponder units 10, 10', 10", and 10'" are disclosed, it is also contemplated that other wireless transponder units having maximum operating temperatures may also be employed in the electrical joint monitoring system 1 without departing from the scope of the disclosed concept.

It is further contemplated that wireless transponder units 10, 10', 10", 10'" may be disposed on any element of the electrical joint 2 without departing from the scope of the disclosed concept. For example, in FIG. 1, the wireless transponder units 10 are disposed on the second conductor 6 of the electrical joint 2. However, it is contemplated that the wireless transponder units 10 may also be disposed on the first conductor 4 without departing from the scope of the disclosed concept. Furthermore, referring to FIG. 5, the electrical joint 2 may further include a fastener 7 in addition to first and second conductors 4,6, and the wireless transponder unit 110 may be disposed on the fastener 7. In particular, the wireless transponder unit 10 is located in a recess 9 formed in the fastener 7. However, it is also contemplated that the wireless transponder unit 110 may be disposed on any part of the fastener 7 without departing from the scope of the disclosed concept.

Figure 6:
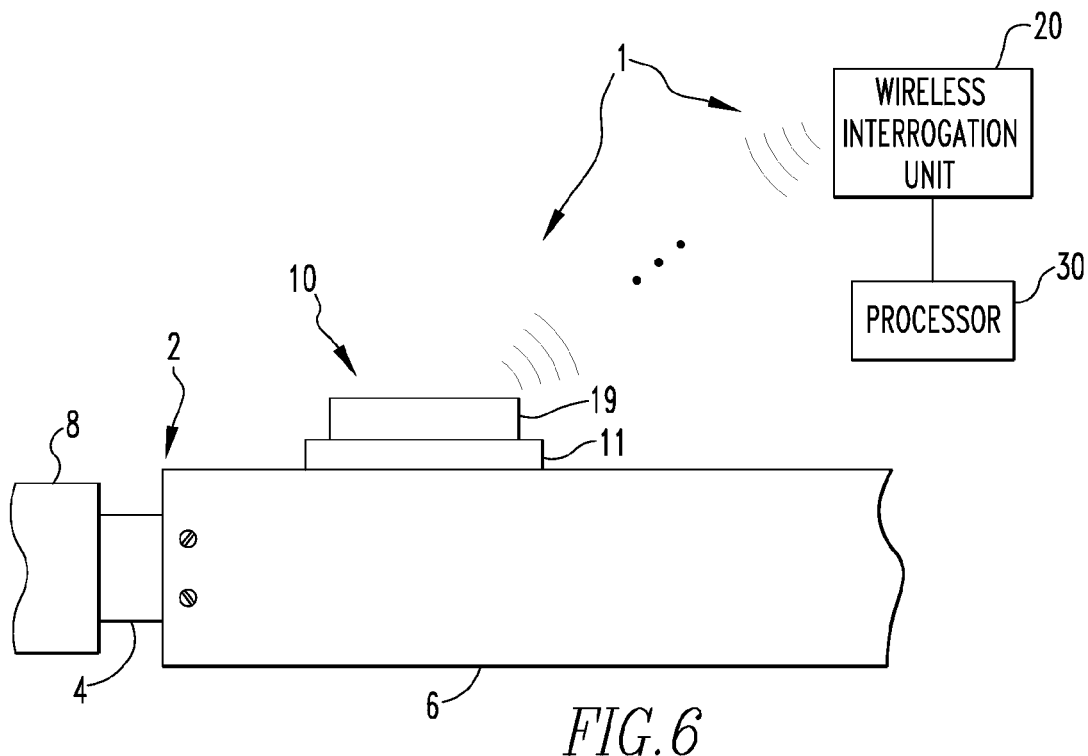
FIG. 6 is a vertical elevation view of a wireless transponder unit including an insulating element in accordance with embodiments of the disclosed concept.

Referring to FIG. 6, the wireless transponder unit 10 further includes a thermally insulating element 11. The thermally insulating element 11 is disposed between the electrical joint 2 and an electronics portion 19 of the wireless transponder unit 10. The electronics portion 19 of the wireless transponder unit 10 includes the integrated circuit 12 and the resonant circuit (see FIG. 2 or FIG. 3). The thermally insulating element 11 is operable to provide a level of thermal insulation between the electrical joint and the electronics portion 19. Employing the thermally insulating element 18 effectively raises the maximum operating temperature of the wireless transponder unit 10. The thermally insulating element 11 is particularly suitable in applications where the electrical joint 2 can normally operate above the maximum operating temperatures of the integrated circuit 12 and/or the resonant circuit.

Figure 7A:
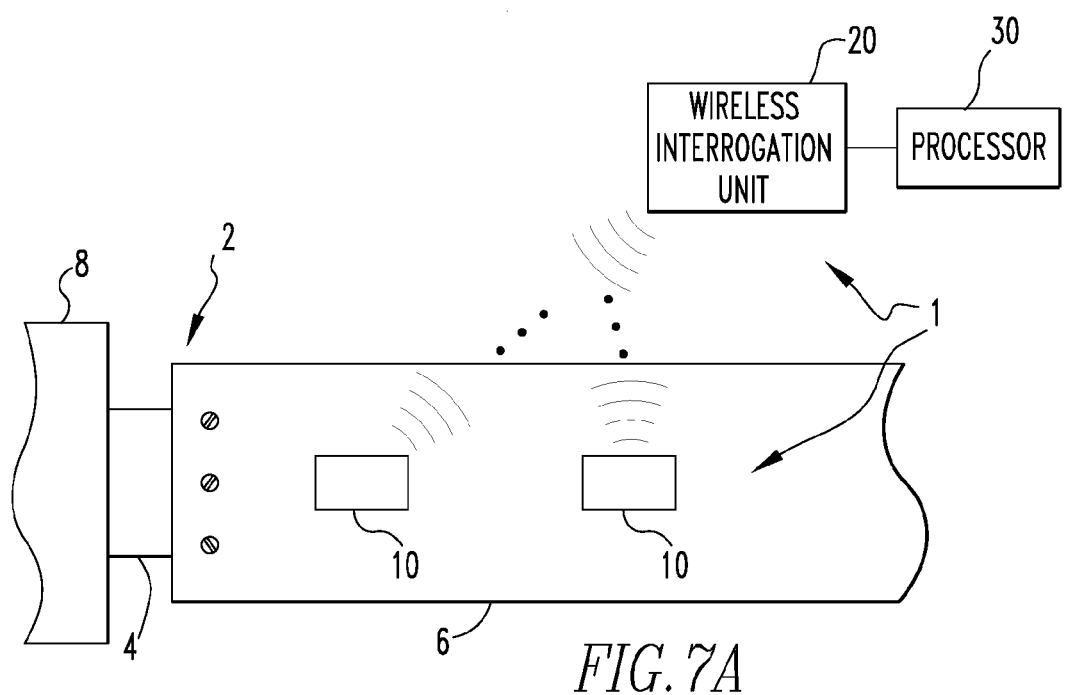
FIGS. 7A and 7B are vertical elevation views of wireless transponder units disposed on electrical joints in accordance with embodiments of the disclosed concept.
Figure 7B:
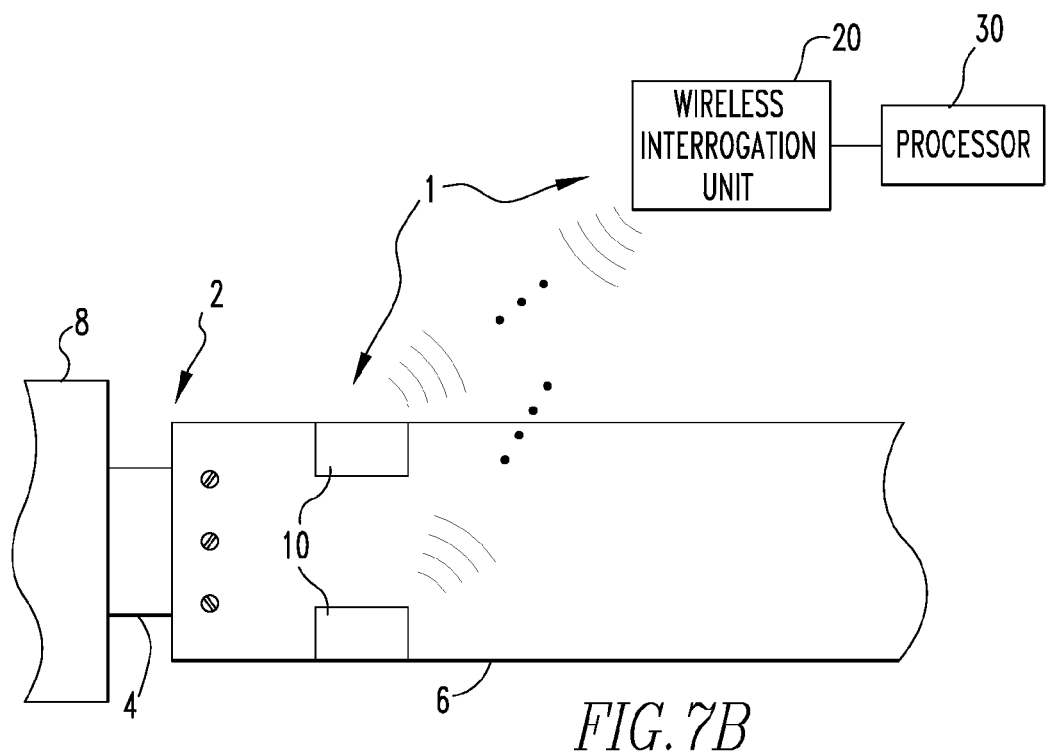

It is contemplated that any number of wireless transponder units 10 may be disposed on an electrical joint 2 without departing from the scope of the disclosed concept. Referring to FIGS. 7A and 7B, multiple wireless transponder units 10 are disposed on a single electrical joint 2. Furthermore, the routine 40 of the processor 30 may be configured to link wireless transponder units 10 disposed on the same electrical joint 2. When wireless transponder units 10 are linked by the processor 30 routine 40, the routine 40 is structured to determine that the electrical joint is faulty only when all of the linked wireless transponder units 10 fail to respond to being interrogated by the wireless interrogation unit 20. If one of the linked wireless transponder units 10 is faulty and fails to respond to being interrogated by the wireless interrogation unit 20, then the processor 30 will not determine that the joint is faulty so long as another linked wireless transponder unit 10 successfully responds to being interrogated by the wireless interrogation unit 20. Thus, providing multiple wireless transponder units 10 on an electrical joint and linking them increases the reliability of the electrical joint monitoring system.

Figure 8:
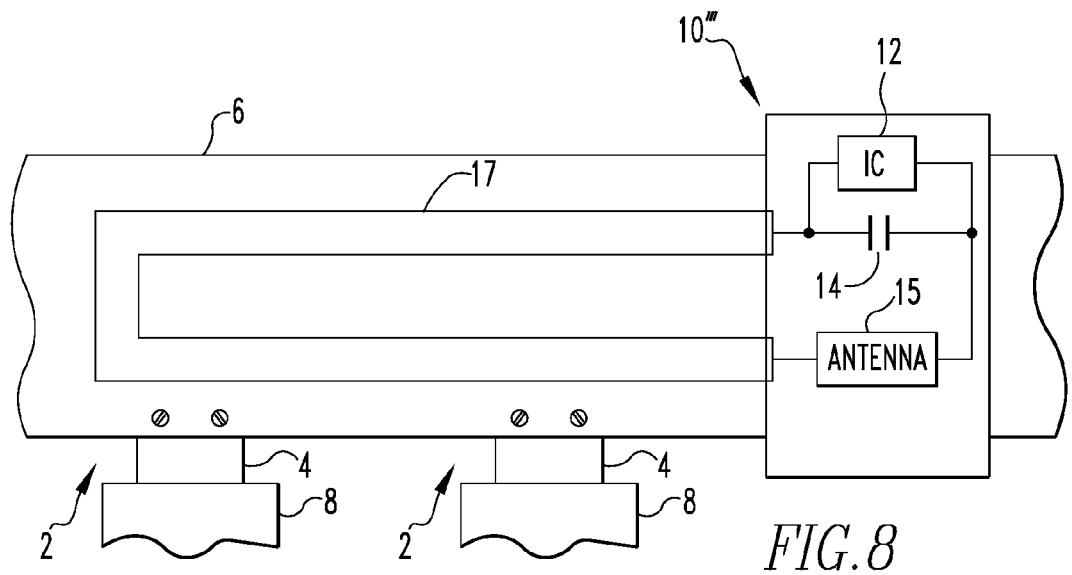
FIG. 8 is a top plan view of a wireless transponder unit shown in block form including a conductive polymer element disposed on an electrical joint in accordance with embodiments of the disclosed concept.

In some example embodiments, one wireless transponder unit 10" may correspond to multiple electrical joints 2, as shown in FIG. 8. Referring to FIG. 8, two electrical joints 2 share the same elongated second conductor 6, and one wireless transponder unit 10" corresponds to both electrical joints 2. The wireless transponder unit 10" includes a PTC resistor 17 (e.g., without limitation, a polymer-based resistor) that extends along the length of the second conductor 6 past both of the electrical joints 2. Thus, a temperature increase caused by either of the electrical joints 2 will cause an increase in the resistance of the PTC resistor 17.

Figure 9:
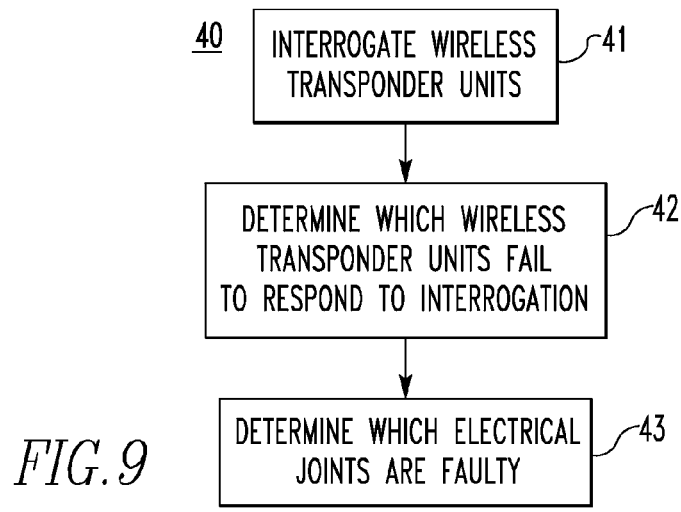
FIG. 9 is a flowchart of a method of monitoring an electrical joint in accordance with embodiments of the disclosed concept.

FIG. 9 shows an electrical joint monitoring routine 40 of the processor 30. The electrical joint monitoring routine 40 starts when the wireless transponder units 10 are interrogated at 41. At 42, the wireless transponder units 42 that fail to respond to being interrogated are determined. Based on which wireless transponder units 10 failed to respond to the interrogated, the faulty electrical joints 2 are determined at 43.

While the wireless interrogation unit 20 and the processor 30 are illustrated as separate elements, it is contemplated that the wireless interrogation unit 20 and the processor 30 may be integrated into a single unit.

The wireless transponder units 10 may be coupled to the electrical joints 2 by any suitable mechanism (e.g., without limitation, with one or more fasteners or an adhesive).

The disclosed concept can also be embodied as computer readable codes on a tangible, non-transitory computer readable recording medium. The computer readable recording medium is any data storage device that can store data which can be thereafter read by a computer system Non-limiting examples of the computer readable recording medium include read-only memory (ROM), non-volatile random-access memory (RAM), CD-ROMs, magnetic tapes, floppy disks, disk storage devices, and optical data storage devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A wireless transponder unit having a maximum operating temperature and being structured to be disposed proximate to an electrical joint, the wireless transponder unit comprising:
   an integrated circuit configured to store identification information; and
   a resonant circuit electrically connected to the integrated circuit, the resonant circuit having a damping factor, said resonant circuit including a capacitor, an antenna, and a resistor having a resistance and a positive thermal coefficient,
   wherein a change in temperature of the wireless transponder unit causes a change in the resistance of the resistor and the damping factor of the resonant circuit, and
   wherein the maximum operating temperature of the wireless transponder unit is based on the damping factor of the resonant circuit, and
   wherein the capacitor is electrically connected in parallel with the integrated circuit.

2. The wireless transponder unit of claim 1, wherein the resistance of the resistor has a non-linear response to the change in temperature.

3. The wireless transponder unit of claim 1, wherein the resistor has a critical temperature; and wherein the maximum operating temperature of the wireless transponder unit is about equal to the critical temperature.

4. The wireless transponder unit of claim 3, wherein the resistor is a polymer-based resistor.

5. The wireless transponder unit of claim 4, wherein the electrical joint includes an elongated conductive member; and wherein the polymer-based resistor is configured to extend along a length of the elongated conductive member.

6. The wireless transponder unit of claim 5, wherein the elongated conductive member corresponds to a plurality of electrical joints; and wherein the polymer-based resistor extends past at least two of the electrical joints.

7. The wireless transponder unit of claim 1, wherein the wireless transponder unit is a radio frequency identification tag.

8. A system for monitoring a plurality of electrical joints, the system comprising:
   a plurality of wireless transponder units, each of the wireless transponder units being disposed proximate to a corresponding one of the electrical joints, having a maximum operating temperature, and being configured to output identification information in response to being interrogated;
   a wireless interrogation unit structured to interrogate the wireless transponder units; and
   a processor having a routine structured to determine a fault of the electrical joints corresponding to a number of the wireless transponder units that fail to respond to being interrogated by the wireless interrogation unit, and
   wherein at least one of the wireless transponder units includes:

an integrated circuit configured to store the identification information; and a resonant circuit electrically connected to the integrated circuit, the resonant circuit having a damping factor, said resonant circuit including a capacitor, an antenna, and a resistor having a resistance and a positive thermal coefficient, and wherein the capacitor is electrically connected in parallel with the integrated circuit.

9. The system of claim 8, wherein the maximum operating temperature of said each of the wireless transponder units is about equal to a maximum temperature at which the integrated circuit operates reliably.

10. The system of claim 8, wherein the resistor has a critical temperature; and wherein the maximum operating temperature of said each of the wireless transponder units is about equal to the critical temperature.

11. The system of claim 10, wherein the resistor is a polymer-based resistor.

12. The system of claim 8, wherein said each of the wireless transponder units further includes a thermally insulating element; and wherein said thermally insulating element is disposed between the corresponding one of the electrical joints and the integrated circuit.

13. The system of claim 8, wherein at least one of the electrical joints includes a fastener; and wherein a corresponding one of the wireless transponder units is disposed on the fastener.

14. The system of claim 8, wherein at least one of the wireless transponder units is coupled to a corresponding one of the electrical joints by at least one of a fastener and an adhesive.

15. The system of claim 8, wherein at least two of the wireless transponder units are disposed on a corresponding one of the electrical joints; and wherein the routine of the processor is structured to determine a fault of the electrical joint corresponding to said at least two of the wireless transponder units when all of said at least two of the wireless transponder units fail to respond to being interrogated by the wireless interrogation unit and, otherwise, to not determine a fault of the electrical joint corresponding to said at least two of the wireless transponder units.

16. The system of claim 8, wherein the processor is integrated into the wireless interrogation unit.

17. The system of claim 8, wherein the routine of the processor is structured to set a threshold interrogation response rate for at least one of the wireless transponder units and to determine that said at least one of the wireless transponder units fails to respond to being interrogated by the wireless interrogation unit when an interrogation response rate of said at least one of the wireless transponder unit is less than the threshold interrogation response rate.

18. The system of claim 8, wherein at least one of the wireless transponder units is a radio frequency identification tag.

19. A method of monitoring a plurality of electrical joints, the method comprising:

interrogating a plurality of wireless transponder units, each of the wireless transponder units being disposed proximate to a corresponding one of the electrical joints, having a maximum operating temperature, and being configured to output identification information in response to said interrogating;

determining which of the wireless transponder units fail to respond to the interrogation; and determining a number of faults of a number of the electrical joints corresponding to a number of the wireless transponder units that fail to respond to said interrogating, and wherein at least one of the wireless transponder units includes:

an integrated circuit configured to store the identification information; and a resonant circuit electrically connected to the integrated circuit, the resonant circuit having a damping factor, said resonant circuit including a capacitor, an antenna, and a resistor having a resistance and a positive thermal coefficient, and wherein the capacitor is electrically connected in parallel with the integrated circuit.

20. The method of claim 19, further comprising:

linking at least two of the wireless transponder units disposed proximate to a corresponding one of the electrical joints; and said determining a number of faults further includes determining a fault of the electrical joint corresponding to said at least two of the wireless transponder units when all of said at least two of the wireless transponder units fail to respond to said interrogating and, otherwise, not determining a fault.

21. The method of claim 19, further comprising:

said determining which of the wireless transponder units fail to respond to said interrogating further includes setting a threshold interrogation response rate for at least one of the wireless transponder units and determining that said at least one of the wireless transponder units fails to respond to said interrogating when an interrogation response rate of said at least one wireless transponder units is less than the threshold interrogation response rate.

22. A non-transitory computer readable medium storing one or more programs, including instructions, which when executed by a computer, causes the computer to perform a method of monitoring a plurality of electrical joints, the method comprising:

interrogating a plurality of wireless transponder units, each of the wireless transponder units being disposed proximate to a corresponding one of the electrical joints, having a maximum operating temperature, and being configured to output identification information in response to said interrogating;

determining which of the wireless transponder units fail to respond to the interrogation; and determining a number of faults of a number of the electrical joints corresponding to a number of the wireless transponder units that fail to respond to said interrogating, and wherein at least one of the wireless transponder units includes:

an integrated circuit configured to store the identification information; and a resonant circuit electrically connected to the integrated circuit, the resonant circuit having a damping factor, said resonant circuit including a capacitor, an antenna, and a resistor having a resistance and a positive thermal coefficient, and wherein the capacitor is electrically connected in parallel with the integrated circuit.

23. The non-transitory computer readable medium of claim 22, the method further comprising:

linking at least two of the wireless transponder units disposed proximate to a corresponding one of the electrical joints; and said determining a number of faults further includes determining a fault of the electrical joint corresponding to said at least two of the wireless transponder units when all of said at least two of the wireless transponder units fail to respond to said interrogating and, otherwise, not determining a fault.

24. The non-transitory computer readable medium of claim 22, the method further comprising:

said determining which of the wireless transponder units fail to respond to said interrogating further includes setting a threshold interrogation response rate for at least one of the wireless transponder units and determining that said at least one of the wireless transponder units fails to respond to said interrogating when an interrogation response rate of said at least one wireless transponder units is less than the threshold interrogation response rate.

25. A wireless transponder unit having a maximum operating temperature and being structured to be disposed proximate to an electrical joint, the wireless transponder unit comprising:

an integrated circuit configured to store identification information; and a resonant circuit electrically connected to the integrated circuit, the resonant circuit including a capacitor, an antenna, and a resistor having a resistance and a negative thermal coefficient, wherein a change in temperature of the wireless transponder unit causes a change in the resistance of the resistor, wherein the resistor is electrically connected in parallel with the capacitor, and wherein the maximum operating temperature of the wireless transponder unit is based on the resistance of the resistor, and wherein the capacitor is electrically connected in parallel with the integrated circuit.

* * * * *